United States Patent [19]
Throndson

[11] 3,819,134

[45] June 25, 1974

[54] AIRCRAFT SYSTEM LIFT EJECTOR

[75] Inventor: Lester W. Throndson, Westerville, Ohio

[73] Assignee: Rockwell International Corporation, Pittsburgh, Pa.

[22] Filed: Nov. 30, 1972

[21] Appl. No.: 311,011

[52] U.S. Cl. .......... 244/42 CC, 180/117, 244/12 R, 244/42 CD, 244/52
[51] Int. Cl. ............................................. B64c 15/06
[58] Field of Search......... 244/42 CD, 42 CC, 42 C, 244/40 R, 12 R, 23 R, 23 A, 52; 239/265.17, 265.25; 239/265.27; 180/117

[56] References Cited
UNITED STATES PATENTS

| 2,922,277 | 1/1960 | Bertin | 244/42 CC X |
| 3,045,947 | 7/1962 | Bertin et al. | 244/52 X |
| 3,664,611 | 5/1972 | Harris | 244/42 CD |

FOREIGN PATENTS OR APPLICATIONS

| 871,470 | 6/1961 | Great Britain | 244/12 R |
| 1,267,920 | 6/1961 | France | 244/12 R |

Primary Examiner—Milton Buchler
Assistant Examiner—Barry L. Kelmachter

[57] ABSTRACT

Apparatus and methods of operation are disclosed for combining high-energy primary flow fluid (normally a gaseous medium obtained from an aircraft system primary power plant or engine) and induced secondary flow fluid (ambient air) in the essentially conventional throat and diffuser sections of an ejector normally installed in an aircraft fixed wing, canard, or similar airfoil member to significantly increase ejector thrust augmentation ratio performance with a limited number of injection slots or openings of limited size to achieve high diffusion rates and substantially reduced propulsion energy losses attributed to flow resistance, flow backage, and flow separation, to permit ejector configurations of relatively small planform and relatively short diffuser lengths, to achieve apparatus stowability in conventional flight, to achieve design simplicity which allows variable geometry ejector for installation in aircraft system wing and canard airfoils, and to obtain other important aircraft system operating characteristics.

14 Claims, 11 Drawing Figures

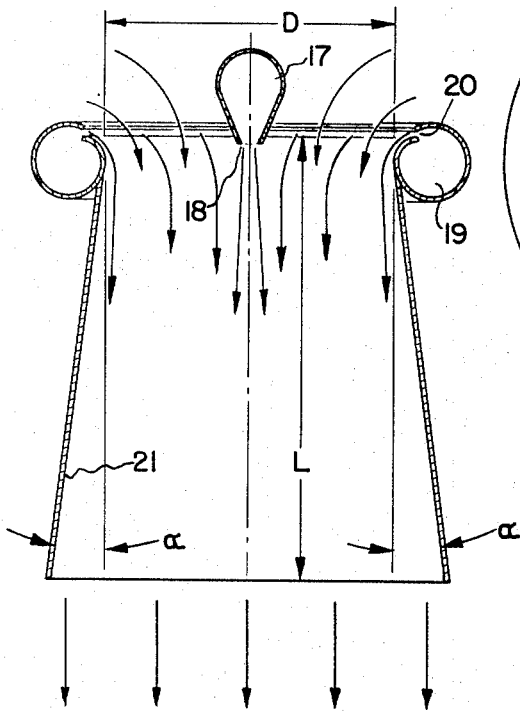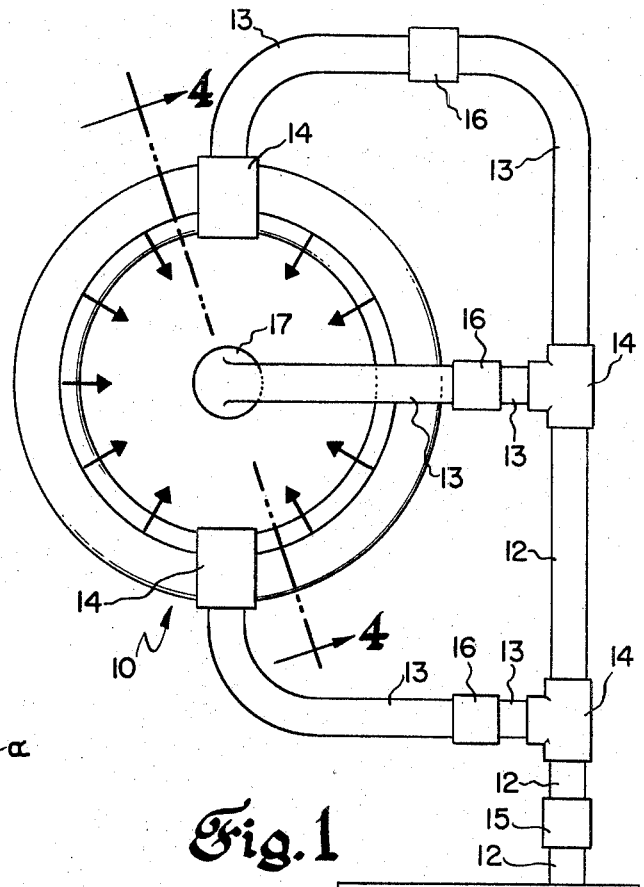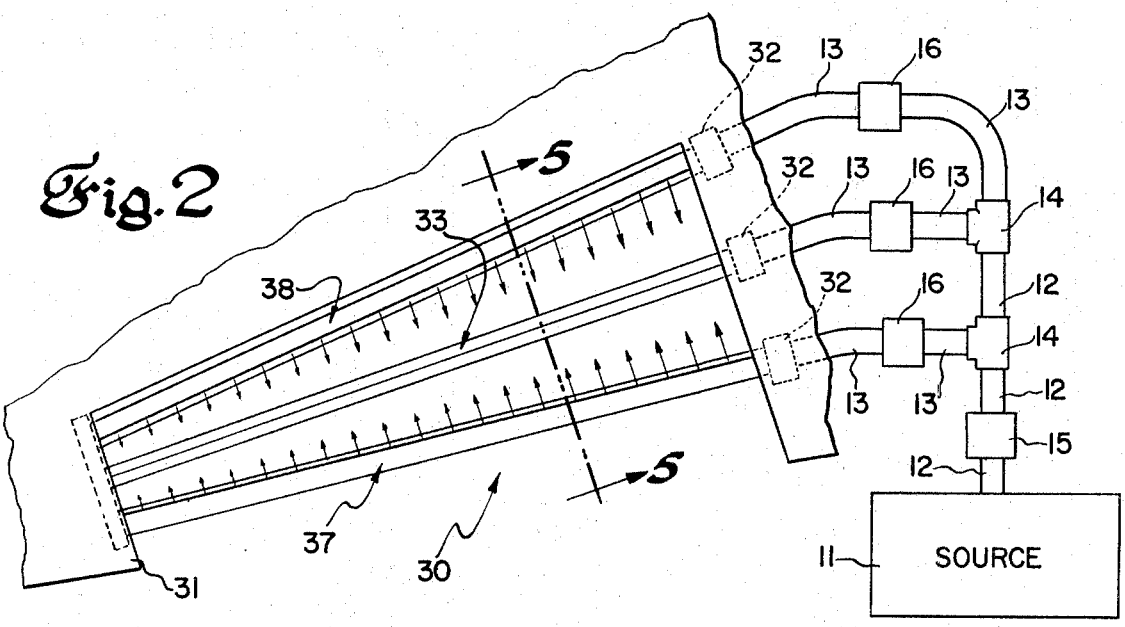

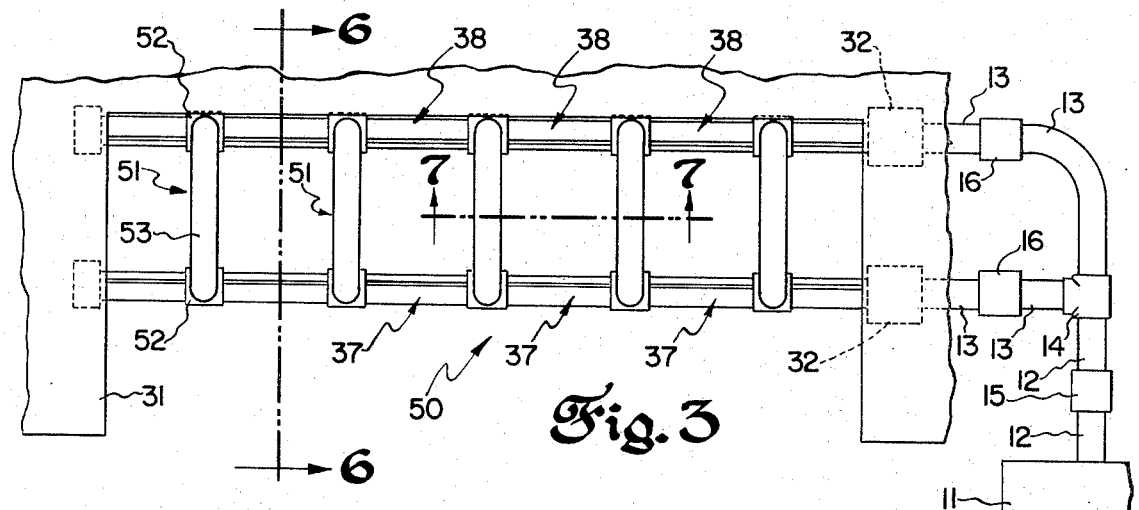
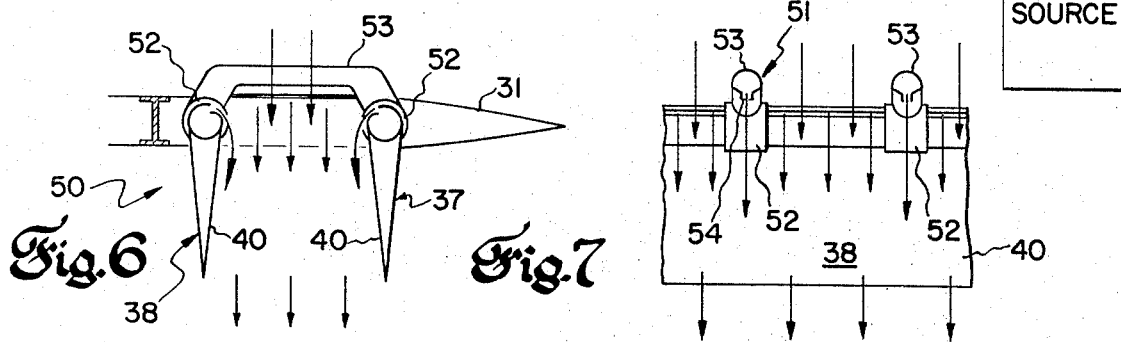
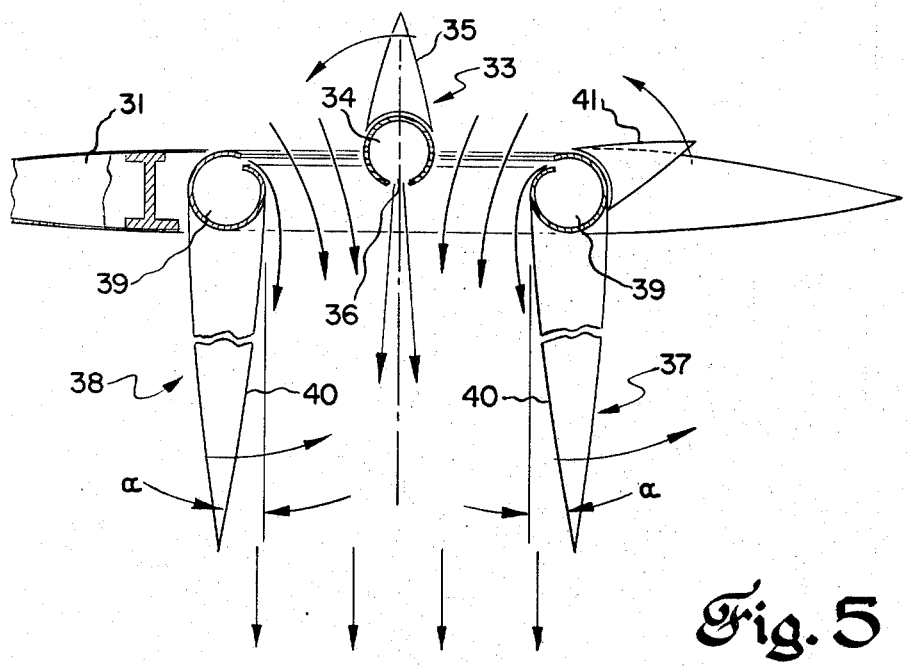

3,819,134

AIRCRAFT SYSTEM LIFT EJECTOR

SUMMARY OF THE INVENTION

Lift ejector apparatus having conventional throat and diffuser sections in its operating configuration is installed in an aircraft system airfoil member, is provided with center injector means and additionally with Coanda injector means, and is operably connected to a source of high-energy primary flow fluid such as an aircraft turbo-jet engine turbine section by appropriate supply and distribution duct means. The injected primary flow fluid (combustion gases) from both said injector means is combined with entrained secondary flow fluid (air), induced through the ejector inlet opening, at and in the ejector throat and diffuser sections to both significantly increase ejector thrust augmentation ratio performance and minimize ejector or system energy losses in comparison, for instance, to comparably sized and configured conventional multi-tube injector lift ejector apparatus. The invention achieves thrust augmentation ratios at least to as great as approximately 1.55 employing a secondary flow entrance area to primary flow entrance (slot) area ratio of approximately 12.5, and is especially significant with respect to ejector configurations wherein the ratio of ejector length to ejector throat diameter is less than approximately 2.5 and especially in the range of approximately 1 to 2.

DESCRIPTION OF THE DRAWINGS

FIG. 1 is a schematic plan view of assembled basic elements utilized in the aircraft system lift ejector of this invention having a throat section with circular planform;

FIG. 2 is a schematic plan view of an embodiment of the lift ejector invention installed in an aircraft fixed wing or the like and having a throat section with trapezoidal planform;

FIG. 3 is a schematic plan view of an embodiment of the lift ejector invention installed in an aircraft fixed wing or the like and having transversely-oriented center injectors in combination with an ejector throat section with a rectangular planform;

FIG. 4 is a schematic sectional view taken at line 4—4 of FIG. 1;

FIG. 5 is a schematic cross-sectional view taken at line 5—5 of FIG. 2;

FIG. 6 is a schematic cross-sectional view taken at line 6—6 of FIG. 3;

FIG. 7 is a schematic fragmentary longitudinal section view taken at line 7—7 of FIG. 3;

DETAILED DESCRIPTION

Figure 8:
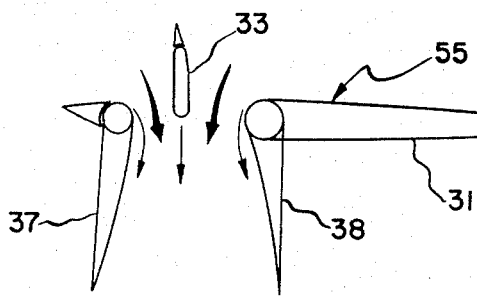
FIGS. 8, 9 and 10 are schematic cross-sectional views of a representative heavier-than-air aircraft lift-sustaining air foil having the lift ejector of this invention incorporated therein and operating under hovering flight conditions, transistional flight conditions, and conventional cruise or forward flight conditions, respectively.

Assembly 10 illustrated schematically and in sectional detail in FIGS. 1 and 4 is distinguished from the invention embodiments illustrated in FIGS. 2, 3 and 5 through 10 of the drawings primarily by the planform of the ejector throat configuration and by the absence of airfoil construction details. The principal elements comprising the FIG. 1 arrangement are separately described in the following subparagraphs, each identified initially by the appropriate reference numeral in the drawings, as to element nomenclature, details of form and construction, and statement of principal function or functions:

11; ejector high-energy fluid source; normally in the form of a source of pressurized gaseous medium at a pressure ratio of approximately 1.3 or greater (e.g. 1.3 to 3.0 or above) at the source discharge face such as an aircraft system turbo-fan engine fan, or turbo-jet engine turbine section; provides primary flow fluid gas to the lift ejector and such may be at an elevated temperature (e.g. 65°C. to 600°C.) relative to ambient or atmospheric temperature (e.g. nominal 15°c.).

12; supply duct sections; normally in form of metallic construction or fibre-reinforced thermosetting resin construction and in conventional duct cross-sectional configurations preferable sized to minimize internal fluid flow pressure or energy losses and to achieve flow velocities of about 0.25 Mach number in typical applications but sometimes to as great as about 0.4 Mach number; directs primary flow fluid from source 11 to primary flow distribution ductwork;

13; distribution duct sections; similar in form and configuration to duct sections 12; direct proportioned primary fluid flow to system injectors;

14; duct fittings; similar in construction to duct sections 12 and 13 but of conventional fitting configuration; joins duct sections together and to the other system fluid distribution elements;

15; primary flow control valve; essentially of metallic construction and conventional configuration and may take form of plug nozzle with cooperable diverter; regulates/diverts flow of primary flow fluid from source 11 through supply duct sections 12;

16; proportioning valves; of conventional metallic construction and configuration; proportioning of primary flow fluid to minimize system energy losses preferable and normally is accomplished by varying duct diameters and slot and nozzle opening sizes, but if elements 16 are provided in the ejector arrangement, such function to further control the primary flow fluid from source 11 for proper distribution to individual injectors in the apparatus, in either case proportioning normally being from 30 to 70 percent of total primary fluid flow to the ejector center injector and the balance to the ejector Coanda injector;

17; center injector; of streamlined duct-like or tube-like construction using materials comparable to the materials comprising duct sections 12 and 13 and having a location above the ejector throat section and an operating orientation downwardly along the general flow direction of the lift ejector diffuser section; directs primary flow air to the center of the ejector throat section for downward projection essentially along the ejector diffuser section flow air;

18; nozzle opening; an opening in the center injector sized to achieve a desired flow and flow velocity approaching or in excess of approximately 0.7 Mach number and located preferably slightly above or at the ejector throat section; provides downward primary air flow at the throat center in the form of a free jet core and at a proper velocity;

19; Coanda injector supply duct; generally similar to injector means 17 in construction materials but of annular planform configuration with the toroidal inside diameter essentially corresponding to the ejector throat section diameter and the toroidal average diameter corresponding to the diameter of the ejector circular inlet area; typically directs primary flow fluid to the ejector inlet perimeter for injection into system 10, for approximately 90° to 110° Coanda effect rotation (15° to 30° minimum), and for mixing and downward projection essentially in nonseparated relation to the diverging walls of the ejector diffuser section;

20; Coanda slot opening; ring-like slot opening in the Coanda injector supply duct substantially coextensive with the perimeter of the ejector circular inlet area and sized to achieve a primary fluid flow in the desired 30 to 70 percent total flow range and with a velocity approaching or in excess of approximately 1.0 Mach Number; the opening, by virtue of its location and orientation essentially injects primary flow fluid radially inwardly toward the inlet area center in the form of a wall jet and approximately at ring angles to the lift ejector operating longitudinal axis whereupon it is rotated by the Coanda effect typically approximately 90° to 110° into a downward path generally along the direction of the wall defining the ejector divergent diffuser section; and 21; diffuser section wall; of metallic composition or fibre-reinforced thermosetting resin composition in plate-like, circumferentially continuous form and joined and faired to the wall of Coanda injector means 19 to provide a smooth transition form the ejector throat to the divergent ejector diffuser section exit opening; length essentially accomplishes mixing of ejector primary and secondary fluid flows and diffusion allows pressures produced at the inlet to induce ejector secondary fluid flow and develop improved ejector thrust.

In addition, the drawings are provided with certain of the following reference symbols identifying features or characteristics of the ejector construction of the invention useful for analytical purposes:

L; ejector length (height); extents from the plane of ejector exit opening to the plane of ejector inlet opening, the latter normally being positioned a relatively small distance above the plane of the ejector throat section;

D; ejector diameter; essentially the diameter of the ejector throat section except that in cases of noncircular throat section planforms the dimension may correspond to the average planform dimension of the throat area affected by the center injector and the ejector cross-section being anaylzed;

$A_{th}$; cross-sectional (planform) area of lift ejector throat section;

$A_i$; cross-sectional (planform) area of lift ejector inlet;

$A_e$; cross-sectional (planform) area of lift ejector exit;

$A_p$; cross-sectional area of primary fluid flow which in most instances is the sum of the discharege area of the center injector nozzle opening and the Coanda injector slot opening;

$A_s$; cross-sectional area of secondary or entrained fluid flow which in most instances, because of relative absence of blockage in the ejector throat section by the center injector means 17, essentially corresponds to the ejector inlet area $A_i$; and α; ejector diffuser section wall divergence angle (half-angle) relative to the lift ejector axis in the direction of principal air flow.

Heavied arrow showings in the drawings indicate principal flow directions for the primary, secondary, and combined fluid flows. The lift ejector discharge flow at the exit face is particularly noteworthy in view of the fact that it is substantially of improved distribution across the exit face compared to non-combined injection means.

In FIG. 2 the lift ejector apparatus embodiment 30 is combined in part with supporting airfoil structure referenced generally as 31. Those elements of the embodiment which differ significantly from FIG. 1 and FIG. 4 in detail are as follows:

32; actuator means; conventionally constructed actuator devices that are each installed intermediate a distribution duct section 13 and a rotatable injector, and that are each typically powered by a known hydraulic/electric boost means in a closed-loop system responsive to manual control or regulation; function to rotate or otherwise move the connected injector relative to support structure to properly position the connected injector means in its operating position;

33; straight-line center injector assembly; comprised of a slotted, duct-like straight-line nozzle injector in combination with a fairing to provide for aerodynamic streamlining and closure in the lift ejector arrangement; projects part of the primary flow fluid from source 11 as a free jet core to the center of the trapezoidal throat section of the installed lift ejector apparatus 30;

34; straight-line center injector; has characteristics, except for principal planform configuration, of center injector 17; directs primary flow fluid in the operating position for downward projection essentially along the ejector diffuser section flow axis;

35; fairing; airfoil-contoured metallic or fiber-reinforced, thermosetting resing shape or housing attached to and normally supported by tube-like center injector 34; primarily function to provide closure for the opening in the surface of airfoil structure 31 in its closed operating condition, and to provide for streamlined flow around interiorly-contained center injector 34 in the assembly active operating condition;

36; slot opening; in center injector 34 and similar in all its other characteristics, except elongated planform configuration, to the nozzle opening 18 described in connection with ejector embodiment 10, 37 and 38; straight-line Coanda injector assembly; each comprised of a slotted, duct-like straight-line Coanda injector in combination with a fairing to provide for closure and for a streamlined or contoured diffuser wall in the lift ejector embodiment 30; each projects part of the primary flow fluid from source 11 along the interim surface of the ejector diffuser section and for mixing in the diffuser section with secondary air and with other primary flow air;

39; straight-line Coanda injector; has the construction and form characteristics, including slot openings but except as to planform configuration, of the Coanda injector 19/slot opening 20 combination of the FIGS. 1 and 4 arrangement; directs part of the ejector primary flow fluid received in its operating position from source 11 as a wall jet for rotation and for downward projection essentially along the ejector diffuser section interior wall surfaces and mixing;

40; faring; airfoil-contoured metallic or fiber-reinforced, thermosetting resin shape or housing attached to and normally supported by a straight-line Coanda injector 39; primarily functions to provide closure for the under-surface opening of structure 31 in its closed operating condition, and to provide for definition of the ejector diffuser section when operated to its open or active operating condition by the associated actuator means 32; and 41; sub-fairing; of conventional construction and aero-dynamically streamlined form hingedly attached to assembly 37 and actuated to its operating condition by separate (not shown) actuating means or geared connection to assembly 37; provided primarily to develop complete closure for the adjacent upper-surface opening in structure 31 when apparatus embodiment 30 is actuated to its closed or inoperative condition.

Another embodiment of the instant invention is generally similar to embodiment 30 but is not shown in the drawings. Such additional embodiment differs in that it includes two assemblies 33 positioned in plan intermediate assemblies 37 and 38 and in spaced-apart relation relative to each other. By this alternate arrangement a greater center injection primary fluid flow can be developed.

The FIG. 3 lift ejector apparatus embodiment 50 differs from the previously-discussed embodiments with respect to general planform and also with respect to orientation and configuration of the included center injector means. More specifically, apparatus embodiment 50 has a rectangular planform and the center injector has nozzle openings that are oriented transverse of the ejector throat section longitudinal axis rather than parallel to it or in the geometrical center and that are spaced apart throughout the throat section longitudinal extent. The important element differences over the above-discussed embodiments, as illustrated in FIGS. 3, 6 and 7 are:

51; transverse center injector sub-assembly; comprised essentially of a duct oriented transverse to the longitudinal axis of ejector embodiment 50, and in most applications located immediately adjacent the upper mold line of structure 31, and of cooperating transverse nozzle which projects parts of the primary flow fluid from source 11 at spaced-apart positions downward through the center of the rectangular planform throat section of the lift ejector embodiment 50;

52; slip fitting; an essentially conventional metallic fitting installed in injector assemblies 37 or 38 at spaced-apart positions; provided for purposes of attaching assemblies 51 to straight-line Coanda injector assemblies 37 and 38, yet permits rotation of fairings 40 and assemblies 37, 38 relative to supporting structure.

53; transverse center injector duct; has characteristics, except for orientation and details of attachment to straight-line Coanda injector assemblies 37 and 38 at each extreme, of center injector 34; directs primary flow fluid in the embodiment 50 principal operating mode for downward projection essentially along the ejector diffuser section flow axis.

54; slot-opening; in transverse center injector duct 53 and similar in all its other characteristics, excepting planform and elevational configurations, to the slot opening 36 described in connection with lift ejector embodiment 30; functions in the manner of nozzle opening 18 (embodiment 10) and slot opening 36 (embodiment 30).

Figure 9:
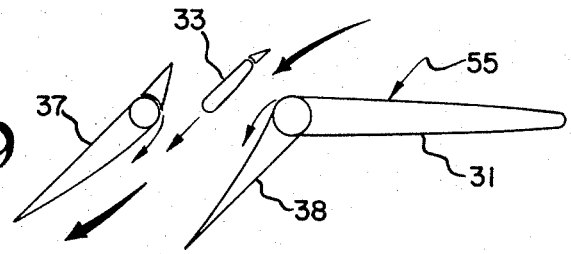
Figure 10:
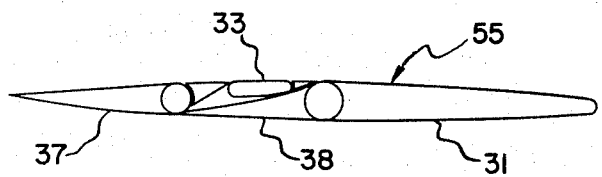

FIGS. 8, 9, 10 are provided by way of background information and are pertinent to one application of the instant invention. Such application involves incorporation of the improved lift ejector into fixed wing 55 of an aircraft system having both conventional flight performance and V/STOL flight performance capabilities and is essentially based on the embodiment illustrated in FIGS. 2 and 5. Wing 55 and the installed lift ejector may be operated in a vertical take-off and landing or hovering mode (FIG. 8), a transistion (FIG. 9), or in the conventional cruise mode (FIG. 10). It should be noted that the ejector is operated to develop improved thrust augmentation only in FIG. 8 and FIG. 9 conditions.

Figure 11:
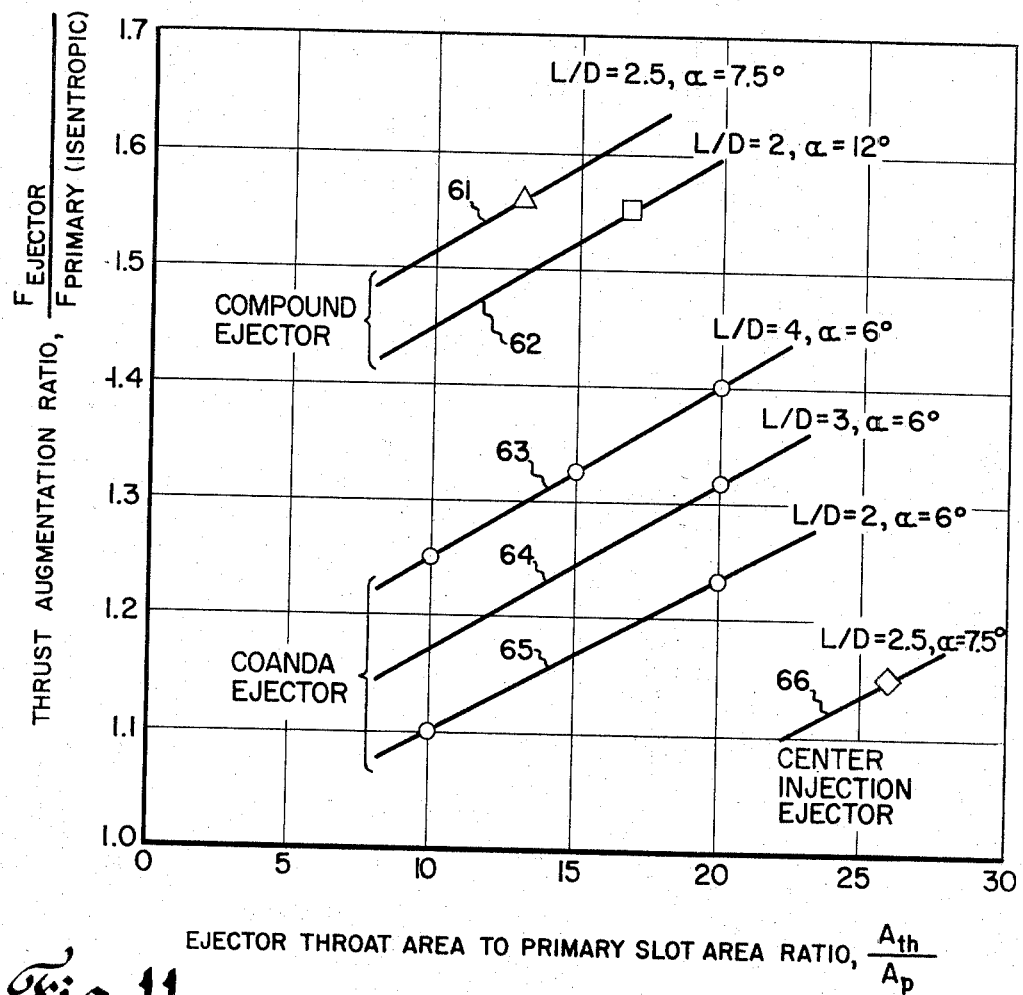
FIG. 11 graphically illustrates thrust augmentation ratio performance achieved by the instant invention in comparison to thrust augmentation ratio performance achieved with conventional lift ejector apparatus or non-combined injection means.

FIG. 11 provides quantitative information regarding the performance capabilities and characteristics of the instant invention. Curves 61 and 62 indicate the magnitude of thrust augmentation obtained with the instant invention at L/D ratios of 2.5 and 2, respectively. In the case of curve 61, which is in part based on actual test data and in part on theoretical projection, the test embodiment of the compound ejector was operated with a divergence half-angle ($\alpha$) of 7.5°. Curve 62, on the other hand, involved a divergence half-angle of 12°.

The performance of the ejector of the invention, as manifested by curves 61 and 62, also is compared in FIG. 11 to the performance of conventional ejectors of comparable design and operating parameters having only Coanda injection (curves 63 through 65) at 6° half-angle divergence or only conventional center injection (curve 66) at $\alpha = 7.5°$. It is apparent from curves 63 through 66 that for comparable rations of ejectors throat area to primary slot area, significantly improved thrust augmentation ratios are obtained with the present invention. Shorter design lengths (L) are achieved by practice of the invention as a result of permitting utilization of high divergence half-angles ($\alpha$) with improved diffuser wall boundary layer control.

In considering the foregoing described invention, careful distinction must be made between introducing primary flow fluid into the ejector system by means of a Coanda slot opening in comparison to introducing such primary flow fluid into the ejector by tangential injection over the diffuser wall as such is typically accomplished from a region near the ejector throat. In one test arrangement involving injection from opposed Coanda slot openings as in FIG. 3 arrangement an obtained thrust augmentation ration of 1.35 was reduced to a value of 1.2 when one opposed ejector inlet Coanda slot opening was replaced with a wall-tangent throat area injector operated at otherwise identical fluid flow conditions. Studies of flow separation from the ejector diffuser wall as a function of diffuser divergence angle established that in a case of distinct wall separation at a 6° half-angle with center injection only, no separation was observed with the additional introduction of Coanda slot injection as described in connection with this invention.

Also, opposed Coanda slot opening injection is considered to efficiently turn high pressure ratio (e.g. 3.5 to 4) fluid flows over a relatively small arc. From the standpoint of effecting Coanda flow turning without separation, the ratio of vane radius or turn curvature adjacent the slot opening to slot height is important and fortunately is not considered highly critical. With a small radius to a slot-height ratio (approximately 5) flow detachment from the ejector wall becomes apparent at a pressure ratio of about 1.8 and is based on observed detachment after about 50° of turning. Increasing the ratio of surface turning radius to slot-height functions to improve the obtained thrust augmentation ratio particularly when at values in the range of approximately 10 to 15. From an aircraft system standpoint, the instant invention is particularly important with respect to obtaining improved engine size cruise matching to thus obtain reduced system engine weight and increased mission capability. Other advantages such as lower downwash velocities, reduced noise, and avoidance of large pitching or rolling moments due to engine failure in multi-engine aircraft by ducting techniques are associated with the invention. In some applications, an ejector arrangement in accordance with the present invention installed in an aircraft fuselage may prove effective for obtaining lift during vertical takeoff or during hovering flight operation without the need of utilizing auxiliary engines.

I claim:

1. A method of varying the orientation of a thrust vector axis of fluid-reaction forces applied to an aircraft system airfoil by ejector means installed within the planform of said airfoil, selectively connected to an aircraft system engine producing primary flow fluid in fluid-receiving relation, and having in succession in the general direction of fluid flow therethrough an inlet section with a secondary flow fluid inlet opening at the surface of said airfoil structure and contiguous curved inlet surfaces, a throat section, and a diffuser section with wall surfaces and exit opening, and comprising the steps of:

injecting part of said high-energy primary flow fluid into said ejector means centrally of said inlet section secondary flow fluid inlet opening from above said throat section and as a free jet core at a discharge velocity greater than approximately 0.7 Mach number and directed along an initial thrust vector axis;

mixing secondary flow fluid from above said airfoil and flowed through said inlet section secondary flow fluid inlet opening with primary flow fluid from said free jet core in said ejector means inlet and throat sections;

simultaneously injecting another part of said high-energy primary flow fluid from opposite sides of the perimeter of said inlet section secondary flow fluid inlet opening as wall jets directed substantially at right angles to said initial thrust vector axis and having a discharge velocity greater than approximately 0.7 Mach number;

turning said another part of said primary flow fluid over said contiguous curved inlet surfaces and mixing secondary flow fluid from above said airfoil and flowed through said inlet section secondary flow fluid inlet opening with high-energy primary flow fluid from said wall jets in said ejector means inlet and throat sections;

diffusing and compressing said injected primary flow fluid parts and said mixed secondary flow fluid in said ejector means diffuser section;

discharging said diffused and compressed primary and secondary flow fluids from said ejector means diffuser section exit opening in a direction generally along said initial throat vector axis to below said airfoil structure thereby developing said fluid-reaction forces; and varying the orientation of said fluid-reaction forces thrust vector axis by simultaneously rotating the direction of injection of said free jet core and each said wall jet in like directions and in substantially like degrees.

2. The method defined by claim 1 wherein said simultaneously injected high-energy primary flow fluid is initially turned as wall jets each having a height whose ratio to the mean radius of said curved inlet surfaces is in the range of approximately from 1:5 to 1:15.

3. The method defined by claim 1 wherein said high-energy primary flow fluid is proportioned in a manner whereby approximately from 30 to 70 percent is injected as said free jet core and the balance is injected as said wall jets.

4. The invention defined by claim 1 wherein said simultaneously injected high-energy primary flow fluid is turned over said curved inlet surfaces and through angles in the range approximately from 30° to 110°.

5. The method defined by claim 1 wherein said simultaneously injected high-energy primary flow fluid is turned over said curved inlet surfaces and through angles in the range of approximately 80° to 110°.

6. The method defined by claim 1 wherein said part of said high-energy primary flow fluid injected as said free jet core approximately equals said simultaneously injected another part of said high-energy primary flow fluid injected as said wall jets.

7. In lift ejector means having joined inlet, throat, and diffuser sections and producing fluid-reaction forces from the injection of primary fluid in the inlet section, an injector assembly comprising:

duct means for distributing high-energy primary flow fluid to the injector assembly throughout a reference spanwise length;

surface means fixedly secured to said duct means, extending throughout said reference spanwise length and substantially continuously over a reference chord length from a leading edge to a trailing edge, and having a lift ejector curved inlet section surface portion, a throat section surface portion joined to said inlet section surface portion, and a diffuser section surface portion joined to said throat section surface portion;

a slot opening communicating with the interior of said duct means, positioned at said surface means leading edge, and sized and oriented to flow primary fluid from within said duct means in a direction essentially at right angles to said reference chord length and over said internal surface means curved inlet section surface portion; and bearing means connected to duct means to rotationally support said assembly, said slot opening, said fixedly secured surface means curved lift ejector inlet section surface portion and joined throat and diffuser section surface portions being maintained in fixed relation and orientation relative to each other when said duct means is rotated in said bearing means.

8. In an aircraft system airfoil, lift ejector means having joined inlet, throat, and diffuser sections, selectively connected to a source of high-energy primary flow fluid in fluid-receiving relation, operable to vary the orientation of the thrust vector axis of fluid-reaction forces developed therein, and comprised of:

a first injector assembly having duct means rotationally supported by said airfoil, having an integral aerodynamically-contoured surface substantially continuous over an assembly chord length and terminating at a trailing edge, and provided with slot means at the leading edge of said assembly chord length and sized and oriented to discharge primary flow fluid from said duct means into said lift ejector means inlet section substantially at a right angle to the longitudinal axis of the ejector assembly at a discharge velocity greater than approximately 0.7 Mach number a second injector assembly having duct means rotationally supported by said airfoil in spaced-apart rotational axis relation to said first injector assembly duct means, having an integral aerodynamically-contoured surface substantially continuous over an assembly chord length and terminating at a trailing edge, and provided with slot means positioned at the leading edge of said assembly chord length and sized and oriented to discharge primary flow fluid from said duct means into said lift ejector means inlet section substantially at a right angle to the longitudinal axis of the ejector assembly at a discharged velocity greater than approximately 0.7 Mach number, a third injector assembly having duct means rotationally supported by said airfoil in intermediate and spaced-apart rotational axis relation to said first and second injector assembly duct means and provided with slot means sized and oriented to discharge primary flow fluid from said duct means at a discharge velocity greater than approximately 0.7 Mach number and in a direction substantially centered intermediate the directions of said first and second injector assembly chord lengths; and actuator means connected to said injector assemblies and operable to substantially maintain said first, second, and third injector assembly slot means in their discharge orientation relative to each other and relative to said integral aerodynamically-contoured surfaces when the orientation of said lift ejector means fluid-reaction forces thrust vector axis is varied.

9. The invention defined by claim 8 and further comprised of joined aerodynamically-contoured surfaces integral with said third injector assembly and terminated at a common edge, said third injector assembly having a chord length oriented in the direction of fluid discharge from said third injector assembly slot means, one of said joined integral surfaces having a contour comprising a part of the contour of the upper surface of said airfoil system airfoil when said third injector assembly chord length is oriented in a direction corresponding to the direction of the aircraft system airfoil chord length.

10. In an aircraft system having a primary engine providing high-energy primary flow fluid which produces propulsion forces for the system during forward flight, in combination:

airfoil structure having upper and lower surfaces for developing aerodynamic lift during forward flight;

a pair of rotatable injector means supported by and for rotation relative to said airfoil structure and having surfaces which together comprise, in succession along a longitudinal axis and in the direction of fluid flow therethrough, an ejector inlet section with opposed curved inlet surfaces contiguous to a secondary flow fluid inlet opening of essentially quadrangular planform at said airfoil structure upper surface, an ejector throat section, and an ejector diffuser section with wall surfaces and an exit opening;

center injector means supported by and for rotation relative to said airfoil structure and having a discharge opening positioned in said ejector inlet section secondary flow fluid inlet opening planform generally above said ejector throat section and oriented and sized to inject primary flow fluid flowed therethrough as a free jet core at a discharge velocity greater than approximately 0.7 Mach number toward said ejector throat section and in the direction of said longitudinal axis;

generally opposed slot openings in said pair of rotatable injector means at the perimeter of said ejector inlet section secondary flow fluid inlet opening planform and oriented and sized to inject primary flow fluid flowed therethrough essentially at right angles to said ejector longitudinal axis and at a discharge velocity greater than approximately 0.7 Mach number as wall jets over said contiguous curved inlet surfaces and into said ejector means throat section; and primary flow fluid distribution means connected to said primary engine and to each said injector means to conduct high-energy primary flow fluid from said primary engine for injection into said ejector inlet section, said fluid distribution means being sized to conduct said primary fluid at a flow rate and pressure sufficient to produce said discharge velocities at said center injector means discharge opening and at said pair of rotatable injector means opposed slot openings.

11. The invention defined by claim 10 wherein said primary flow fluid distribution means high-energy primary flow fluid is divided and flowed approximately one-half to said center injector means and the balance substantially equally to each rotatable injector means in said pair of rotatable injector means.

12. The aircraft system defined by claim 10 wherein the height of each said slot opening and the mean curvature radius of said curved inlet surfaces are in a ratio in the range of from 1:5 to 1:15 approximately.

13. The aircraft system defined by claim 10 wherein the ratio of the distance between the plane of said inlet section inlet opening and the plane of said diffuser section exit opening to the spaced-apart dimension of said pair of rotatable injector means throat section surfaces is less that approximately 2.5.

14. The aircraft system defined by claim 10 wherein said primary flow fluid distribution means high-energy primary flow fluid is divided and proportioned approximately from 30 to 70 percent to said center injector means and the balance to said pair of rotatable injector means.

* * * * *